(12) United States Patent
Conner

(10) Patent No.: US 9,213,707 B2
(45) Date of Patent: Dec. 15, 2015

(54) ORDERED ACCESS OF INTERRELATED DATA FILES

(71) Applicant: Watson Manwaring Conner, Brandon, VT (US)

(72) Inventor: Watson Manwaring Conner, Brandon, VT (US)

( * ) Notice: Subject to any disclaimer, the term of this patent is extended or adjusted under 35 U.S.C. 154(b) by 299 days.

(21) Appl. No.: 14/051,441

(22) Filed: Oct. 10, 2013

(65) Prior Publication Data

US 2014/0108433 A1   Apr. 17, 2014

Related U.S. Application Data

(60) Provisional application No. 61/712,806, filed on Oct. 12, 2012.

(51) Int. Cl.
  *G06F 17/30* (2006.01)
  *G06F 9/45* (2006.01)

(52) U.S. Cl.
  CPC ............ *G06F 17/3007* (2013.01); *G06F 8/427* (2013.01); *G06F 17/30103* (2013.01); *G06F 17/30324* (2013.01); *G06F 17/30327* (2013.01)

(58) Field of Classification Search
  CPC ............................ G06F 8/427; G06F 17/30324
  USPC ......... 707/602, 752, 694, 737, 741, 755, 777, 707/797
  See application file for complete search history.

(56) References Cited

U.S. PATENT DOCUMENTS

| | | | |
|---|---|---|---|
| 5,960,435 A | 9/1999 | Rathmann et al. | |
| 6,185,557 B1 | 2/2001 | Liu | |
| 6,587,858 B1 * | 7/2003 | Strazza | ............. G06F 17/30896 |
| 6,732,096 B1 | 5/2004 | Au | |
| 7,657,570 B2 | 2/2010 | Wang et al. | |
| 7,685,083 B2 * | 3/2010 | Fairweather | ............ G06F 8/427 706/45 |
| 8,290,960 B2 * | 10/2012 | Li | ......................... G06Q 30/00 707/737 |
| 2004/0122815 A1 | 6/2004 | Wang et al. | |

* cited by examiner

*Primary Examiner* — Marc Filipczyk
(74) *Attorney, Agent, or Firm* — Ash Tankha; Lipton, Weinberger & Husick

(57) ABSTRACT

A computer implemented method and system for interrelating and providing ordered access to source data files (SDFs) is provided. Each SDF contains one or more records. A parsing component compiles a configuration language (CL) and generates file descriptors usable by an interlinear sort component (ISC) and an interrelated data access component (IDAC). The CL defines adopt and order key fields, a lineage relationship between the SDFs, and one or more predetermined subprograms. The subprograms process an instance of a record from a SDF and a start point and an end point of a sequence or a subsequence of related records from the SDF. The ISC sorts each SDF into the order defined in the CL and attaches a parent position number (PPN) to each child file record. The IDAC uses the PPN to access the sorted SDFs in the order defined by the CL and execute the defined subprograms.

28 Claims, 7 Drawing Sheets

*Script*

*Lineage*

Agent
- Insured
- - Policies
- - - Claims

*Adopt*

Insured    Agent-id
Policies    Insured-id
Claims     Policy#

*Order*

Agent     Agent-name
Insured    Insured-id
Policies    Policy#
Claims     Claim-date

FIG. 2A

|         |                 | *Process* |
|---------|-----------------|-----------|
|         |                 | *Upon*    |
| Agent   | Agent-routine   |           |
| Insured | Insured-routine |           |
| Policies| Policy-routine  |           |
| Claims  | Claim-routine   |           |
|         |                 | *Before*  |
| Insured | New-insured     |           |
| Policies| New-policy      |           |
| Claims  | First-claim     |           |
|         |                 | *After*   |
| Agent   | Final-total     |           |
| Insured | Agent-total     |           |
| Policies| Insured-total   |           |
| Claims  | Policy-total    |           |

FIG. 2B

Patriarch:
> Sort file by order key
> If file is parent, attach position number to each sorted record.

Child:
> Sort child file by adopt key
> Sort parent file by adopt key
> Collate the child file and the parent file, adding parent position number to child
> Sort child file by parent position key and child order key
> If child is also parent, attach position number to each sorted record.

FIG. 3

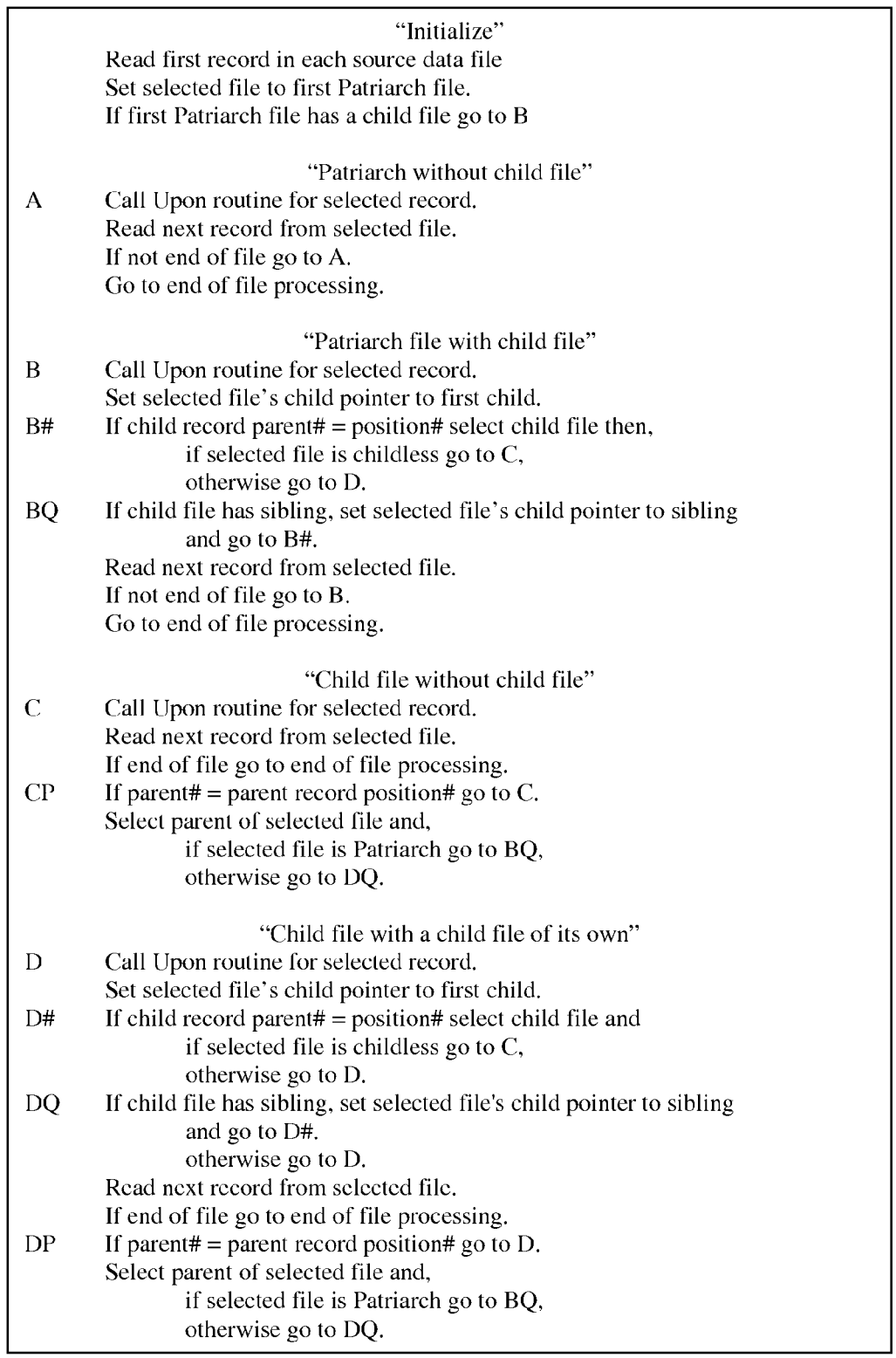

"Initialize"
Read first record in each source data file
Set selected file to first Patriarch file.
If first Patriarch file has a child file go to B "Patriarch without child file"
A    Call Upon routine for selected record.
Read next record from selected file.
If not end of file go to A.
Go to end of file processing.

"Patriarch file with child file"
B    Call Upon routine for selected record.
Set selected file's child pointer to first child.
B#   If child record parent# = position# select child file then,
        if selected file is childless go to C,
        otherwise go to D.
BQ  If child file has sibling, set selected file's child pointer to sibling
        and go to B#.
Read next record from selected file.
If not end of file go to B.
Go to end of file processing.

"Child file without child file"
C    Call Upon routine for selected record.
Read next record from selected file.
If end of file go to end of file processing.
CP  If parent# = parent record position# go to C.
Select parent of selected file and,
        if selected file is Patriarch go to BQ,
        otherwise go to DQ.

"Child file with a child file of its own"
D    Call Upon routine for selected record.
Set selected file's child pointer to first child.
D#   If child record parent# = position# select child file and
        if selected file is childless go to C,
        otherwise go to D.
DQ  If child file has sibling, set selected file's child pointer to sibling
        and go to D#.
        otherwise go to D.
Read next record from selected file.
If end of file go to end of file processing.
DP  If parent# = parent record position# go to D.
Select parent of selected file and,
        if selected file is Patriarch go to BQ,
        otherwise go to DQ.

FIG. 4

ORDERED ACCESS OF INTERRELATED DATA FILES

CROSS REFERENCE TO RELATED APPLICATIONS

This application claims the benefit of provisional patent application No. 61/712,806 titled "Ordered Access Of Interrelated Data Files", filed in the United States Patent and Trademark Office on Oct. 12, 2012.

The specification of the above referenced patent application is incorporated herein by reference in its entirety.

BACKGROUND

Punched card machines for inputting data to a computer are seldom used today, but the methods they employed to interrelate data files are widely employed in current computer data processing technology. Present day programming methods for interrelating data files are still subject to certain limitations of punched card processing.

Punched card machines were necessarily limited to sequential processing of input files by mechanical constraints imposed by physically reading decks of punched cards, one card at a time. A sorting machine and a collating machine were employed to interrelate two card files. Consider an example of an application having a punched card file of insurance policy records and a second punched card file of records of claims against insurance policies. In this example, the policy file is referred to as a "master file" and the claims file is referred to as a "detail file". The records in the detail file are related to the records in the master file by a common key. The common key in this example is a policy number. Every detail record typically has only one master record to which the detail record belongs. In this example, each claim belongs to only one policy. Each master record has a unique common key value, for example, a unique policy number. Any exception to these requirements is considered an error condition.

In the above example, a card sorter was used to sort the master file on the policy number field contained in each of the records of the master file and to sort the detail claims file on the policy number field contained in each of its records. A collator was then used to collate the master file and the detail file. The collator had two input hoppers. One hopper fed the sorted master file and the other hopper fed the sorted detail file. The collator operated in accordance with wiring of a plug board control panel. The plug board was prewired by the installation and could be inserted into and removed from the collator. The collation of the two decks was controlled by the wiring of the plug board. In a typical master/detail application, the two files were collated so that in the resultant file, each master record was immediately followed by the detail records that contained the common key value of the master record. In this example, each policy card record would therefore be immediately followed by card records, if any, of the claims made against that policy. The collated file of the two record types would then be in order by policy number.

If the claims records had been sorted on their claim numbers before they were sorted on their policy numbers, the claims would be further ordered by the claim number within the policy number. This ordering could be useful, for example, in quickly finding a claim under a policy with many claims against the policy. Once the two types of records were collated in this example, however, the collated file could not be further ordered by a key in the master file even if this order may be useful. In the example, the policy and claims records could not be further ordered by an insured name because the claims records did not contain the name of the insured person.

The collated file would then be input to an accounting or tabulating machine, run, and the ordered cards would be used to prepare and print a report on the printer of the machine. The operation of the accounting machine, like the collator, was controlled by a removable plug board wired for a specific application. As the input cards were read, the accounting machine could format and print data from the cards. The accounting machine had electromechanical counters to which card fields could be added and subtracted. This capability was especially used for accumulating totals and subtotals. In this example, the accounting machine could print a policy number and the associated data on the top of a page, then list the claims against the policy number with a settlement payment or a claim reserve amount, print the total claims amounts after the list, and at the end of the run, print the total liability of all the claims for all the policies.

In 1959, the master/detail record processing functions of the accounting machine were made available on the IBM 1401 computer in a language referred to as the report program generator (RPG). The first users of the RPG were familiar with the methods of punched card processing in the unit record machines era. The RPG was designed to be similar to the master/detail processing those users already knew. On an IBM 1401 computer with three or more tape drives, it was possible to sort files with the computer. With the presorted input files, the RPG was capable of combining the collator and accounting machine functions of unit record master/detail processing. Enhanced versions of the original RPG are used in many computer installations today. However, the collating function and its associated processing, often referred to as the RPG cycle, is still present in the latest versions.

The RPG does not have a sort capability. The sort function is supplied by a separate general purpose sort program which uses the computer to order the input files. The combined functions of the collator and accounting machine are then performed by the computer using the RPG cycle. Since 1959, the devices supported by the RPG have been extended to include, for example, tape files, disk files in several formats, and other computer peripherals. The capabilities of the language have likewise been greatly increased and the language now supports many features not directly related to processing two files of differing record types.

The capabilities of the RPG are limited by the constraint that all its input files must be preordered by a common key. An insurance company may have a file of insured records where some insureds have multiple policies, for example, fire, commercial general liability, and auto. The RPG may be used for producing a report where information from the insured's record is listed followed by the insured's policies and immediately after each policy the claims against the policy. If the claim records do not contain the insured's identifier (ID) field, this report cannot be produced with a single RPG run. In order to produce the report, either the insured's ID must be coded with each claim record, or an intermediate claim file with the ID from the policy file added to each claim must be produced, and then a second run made with the intermediate claims file ordered by the policy ID within the insured ID. In the case where the insured's ID must be coded with each claim record, a field is added to the claim which is unnecessary because that field can be obtained from the policy record. In the case where an intermediate claim file with the ID from the policy file added to each claim must be produced, the complexity of the application and the effort needed to implement the application are substantially increased.

A master/detail application that ran on unit record equipment required its designer to have an in depth understanding of the operation of the collator and the accounting machine. Likewise, a master/detail application designed to run under the RPG requires a programmer to have a good understanding of the operation of the runtime collating and calculating functions of the RPG program cycle. Therefore, the RPG application designer is required to understand both what the application is to accomplish and also the RPG language runtime operation.

Partly for this reason, many programs which process interrelated files of multiple types have their collating functions designed and coded ad hoc using application specific logic. As with the RPG, the files are not preordered by the program but by a general purpose sort program. The common business oriented language (COBOL) has a sort verb and COBOL programs can pass records one at a time to the sort program and receive the sorted records one at a time from the sort program. However, the ordering of the records is performed by the general purpose sort program which interfaces with the user's COBOL program at the time of execution. This approach to a master/detail application offers a programmer the complete procedural capabilities of a high level programming language. However, when compared to the RPG, the implementation of the collating and ordered processing functions adds to the design and programming effort and makes program development significantly more time consuming and error prone. Because of the complexities that result when more than two files are involved, an application may be designed to run as a series of programs in which intermediate records are created and processed, even though this is not really necessary.

Another method for interrelating records of different types is through the "join" clause of the "select" statement of the structured query language (SQL), which operates on a relational database (RDB). In SQL/RDB nomenclature, a table corresponds to a file and a row in a table corresponds to a record in a file. Conceptually, a relational database table is stored in the form of a matrix. The "join" clause of SQL combines data from two tables and stores the result in a third table. The "where" clause of the "select" statement specifies the "join" condition. Following the above example, each row of the first table would contain the data from a claim and each row of the second table would contain the data from a policy. The "where" clause would specify that the tables were to be joined on an equal policy condition. The result table would contain a row for each claim. The fields in the row would comprise some or all of the fields from the corresponding policy and claim rows. This result table could be further joined to another table whose rows contain data about each insured. In this case, the "where" clause would specify an equal insured ID condition. The result table could be used to quantify the insurance company's experience with the insured taking into account the premiums and claims from all the policies the insured has with the company. It would be possible to obtain this same data using the RPG. With the RPG, a new file could be created during collation of the policy and claims files in which the records contained the same data as the result table from the first SQL "join" clause. The new file could be sorted on the insured ID and collated with a file of insured records to produce the result of the second "join" clause.

According to the design philosophy of SQL/RDB, the implementation of the "join" clause is not made known to the SQL user. The user cannot therefore predict what SQL will do at runtime to cause the computer to produce its result table. Since the implementation of the "join" clause is not available to the user, the user has no way to write an SQL "join" clause to optimize runtime performance. Moreover, SQL is a query language and not a batch processing language. A given implementation of SQL may be aimed at optimizing queries that produce small result tables rather than result tables that contain a large number of rows. For this and other reasons one would expect an SQL implementation of a large scale master/detail processing application to run slower than an RPG or COBOL implementation of the same application. Furthermore, SQL only operates on data in a relational database. SQL cannot process data from a sequential disk file, much less from tape or other sequential media, whereas RPG and COBOL can process all these physical file types.

RPG and SQL are capable of interrelating two files or tables by a common key. If an RPG or an SQL application requires the interrelation of three files, an implementer of the application must create a combined record file from two of the files and then interrelate the combined record file with the third file. This requires a second runtime execution in the case of RPG and another join operation in the case of SQL. If more than three files or tables are to be interrelated, each additional file requires another runtime RPG execution or another SQL join operation. The reason these extra steps are required is that a single join clause can only join two tables and that an RPG collation run can only combine two types of files. Because of this limitation of RPG and of SQL, an application implementer cannot define the file relationship he/she wants to establish, but is compelled to divide the processing into a series of two file operations.

Hence, there is a long felt but unresolved need for a configurable computer implemented method and system that efficiently interrelates multiple large source data files and provides ordered access to these interrelated source data files.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above mentioned needs for interrelating multiple large source data files of any type stored in any file form, and for providing ordered access to the interrelated source data files. As used herein, the term "ordered access" refers to accessing records of the source data files in an interrelated order defined by a user. The computer implemented method and system disclosed herein provides a generalized method for extending file interrelationships beyond master/detail relationships to any set of relationships that can be expressed in a general tree structure used for interrelating multiple source data files. The computer implemented method and system disclosed herein provides an interface for a user to express the desired relationship between source data files. The computer implemented method and system disclosed herein further extends a typical method of a two file support for the source data files to a method comprising an "upon", a "before", and an "after" record sequence processing of all the source data files that are interrelated in the general tree structure. The computer implemented method and system disclosed herein is not subject to interrelating two files at a time. Each of the source data files contains one or more records and each of the records has one or more key fields. As used herein, the term "key field" refers to a field common to all the records in a source data file and by which the source data file may be ordered.

The computer implemented method and system disclosed herein provides an interrelated data integration application comprising an interlinear sort component and an interrelated data access component that are executable by one or more processors. The interrelated data integration application provides access to the source data files in the order specified by a user in a graphical representation of the file relationships. The interrelated data integration application sorts and accesses the records in the source data files according to a graphical representation of a lineage relationship between the source data files defined in a configuration language. The computer implemented method and system disclosed herein further provides a parsing component executable by at least one processor. The parsing component compiles statements in the configuration language and generates file descriptors usable by the interlinear sort component and the interrelated data access component. The interlinear sort component reorders the source data files. The interrelated data access component accesses and processes the records in the source data files. The parsing component compiles statements in the configuration language, which define the order in which the records in the interrelated source data files are to be accessed. The interlinear sort component reorders each of the source data files so that the records in the reordered file are in the order defined in the configuration language. The interrelated data access component accesses the records in the reordered source data files, recognizes instances of record types and the start point and the end point of sequences or subsequences of record types, and executes predetermined subprograms which are defined by the statements in the configuration language compiled by the parsing component for processing the instances and start points and end points.

The configuration language configures the parsing component to generate file descriptors that describe the user specified order for each of the source data files and assign the predetermined subprograms to perform computation of the aggregated values from the records in the source data files. The configuration language statements define, for example, the lineage relationship between the source data files, one or more adopt key fields configured to define a relationship between the records of at least two of the source data files, one or more order key fields configured to define ordering criteria for the records of one or more of the source data files, and one or more predetermined subprograms configured to perform computation of aggregated values from the records in the source data files. The source data files are graphically related to each other in a tree structure using an array of symbols. In an embodiment, each successive symbol from the array of symbols in the graphical relation between the source data files depicts each successive level of the lineage relationship between the source data files. Each child file containing one or more child file records is related to its parent file containing one or more parent file records in the tree structure by a common adopt key field, where each child file record has a corresponding value in exactly one parent file record. The predetermined subprograms comprise, for example, routines for processing an instance of each of the records in a source data file, routines for processing the start point of a sequence or a subsequence of each of the records of a source data file, and routines for processing the end point of a sequence or a subsequence of each of the records of a source data file.

The interlinear sort component sorts each of the source data files based on one or more of the lineage relationship, the order key fields, and the adopt key fields defined in the configuration language, and attaches a position number to each of the records of each of the source data files. The interlinear sort component orders each source data file into the order specified for that source data file by a user. As used herein, the term "interlinear sort" refers to a sort operation defined by the configuration language in which the relationship of the source data files to one another is specified by an arrangement of lines. In this arrangement of lines, each source data file is named on one line and a prefix defines the relationship of that source data file to the source data files named on the lines preceding that source data file in the arrangement. If the relationship of a source data file line to a preceding source data file line is that of a child to a parent, as in a tree structure, the interlinear sort component sequences the records in the child file into the parent file record order and within that sequence by the order key fields defined for the child file. If a source data file has no parent file, the interlinear sort component sorts each of the source data files based on the lineage relationship defined in the configuration language only by an order key field specified for each of the source data files. The interlinear sort component sorts each child file that has a parent file on the adopt key field configured to relate each child file to the parent file. The interlinear sort component collates the parent file and each child file. The interlinear sort component attaches to each of the child file records contained in each child file the position of its parent file record in the parent file, herein referred to as "parent position number". The parent position number attached to each of the child file records determines the position of each of the child file records of each of the source data files. The interlinear sort component then sorts each child file containing one or more child file records using the parent position number as the primary key and the child file order key field as the secondary key.

The interrelated data access component accesses the records in the source data files after they have been sequenced by the interlinear sort component. The interrelated data access component selects the next source data file to access using the parent position number attached to the current record. Within the selected source data file, the interrelated data access component selects the next record in the sequence created by the interlinear sort component. When a predetermined subprogram is specified for an instance of a record from a given source data file, the interrelated data access component calls the predetermined subprogram when that record is accessed. If a transition occurs from a parent file to a child file and if there is a predetermined subprogram specified for a beginning of a sequence or a subsequence for the child file, the interrelated data access component executes the specified predetermined subprogram for that child file. If a transition occurs from a child file to a parent file and if there is a predetermined subprogram specified for an end of a sequence or a subsequence for the child file, the interrelated data access component executes the specified predetermined subprogram for that child file.

In an embodiment, the interrelated data access component determines the start point and the end point of the sequence or the subsequence of the child file records from the child files of the parent file using the order key fields used to order the parent file. In an embodiment, the interrelated data access component updates the reordered records in the source data files on invocation of one or more of the predetermined subprograms. In an embodiment, the interrelated data access component generates a composite data file comprising the interrelated source data files in the order in which the interrelated source data files are accessed.

BRIEF DESCRIPTION OF THE DRAWINGS

The foregoing summary, as well as the following detailed description of the invention, are better understood when read in conjunction with the appended drawings. For the purpose of illustrating the invention, exemplary constructions of the invention are shown in the drawings. However, the invention is not limited to the specific methods and components disclosed herein.

FIGS. 2A-2B exemplarily illustrate statements in a configuration language to be compiled by a parsing component to generate file descriptors to be subsequently used by an interlinear sort component and an interrelated data access component.

FIG. 3 exemplarily illustrates an operation of the interlinear sort component for sorting records of the source data files.

FIG. 4 exemplarily illustrates an algorithm implemented by the interrelated data access component for accessing records in source data files in an order defined by the configuration language and for executing predetermined subprograms to compute the aggregate values of the records of the source data files.

DETAILED DESCRIPTION OF THE INVENTION

Figure 1A:
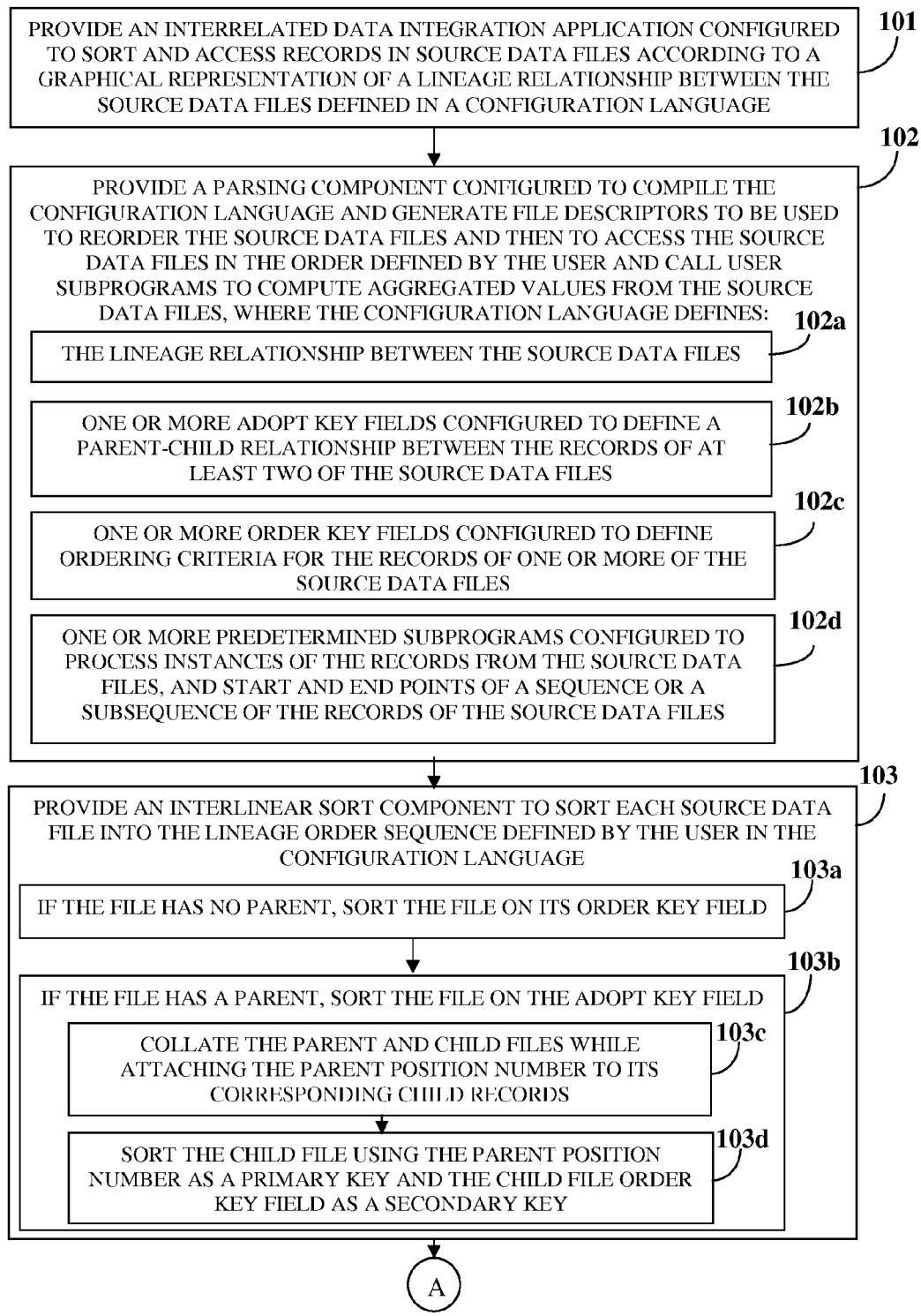
FIGS. 1A-1B exemplarily illustrate a computer implemented method for interrelating multiple source data files and providing ordered access to the interrelated source data files.
Figure 1B:
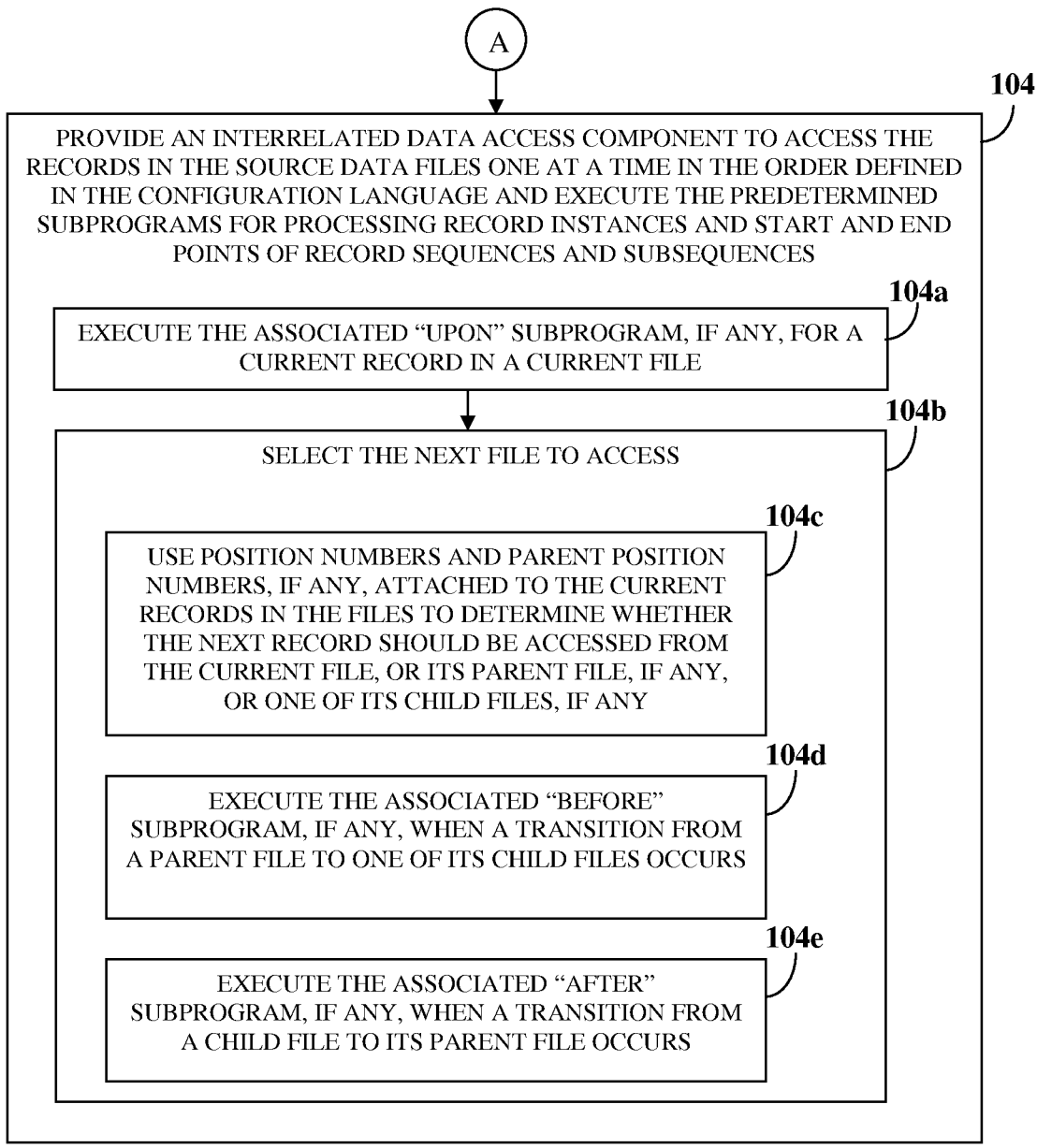

FIGS. 1A-1B exemplarily illustrate a computer implemented method for interrelating multiple source data files and providing ordered access to the interrelated source data files. As used herein, the term "ordered access" refers to accessing records in a set of source data files in an interrelated order defined by a user. The computer implemented method and system disclosed herein uses a computer to order and to provide ordered access to interrelated source data files of records of different types. The computer implemented method and system disclosed herein provides 101 an interrelated data integration application executable by at least one processor configured to sort and access multiple records in source data files according to a graphical representation of a lineage relationship between the source data files defined in a configuration language. The interrelated data integration application accesses multiple source data files in a user defined order and computes aggregated values from the source data files. The interrelated data integration application comprises an interlinear sort component and an interrelated data access component. The interrelated data integration application refers to an application that processes a user specified set of source data files using the interlinear sort component followed by the operation of the interrelated data access component on the source data files as reordered by the interlinear sort component. Each of the source data files contains one or more records and each of the records in the source data files has one or more user specified key fields containing values by which the source data file may be ordered. As used herein, the term "key field" refers to a field common to all the records in a source data file and by which the source data file may be ordered. The computer implemented method performs a scripted interlinear adoption sorting of the interrelated source data files.

The computer implemented method and system disclosed herein employs the following phases: a compilation phase, an interlinear sort phase, and an interrelated data access phase. The compilation phase compiles a script in which parent-child relationships between two source data files are defined. If, in an embodiment, each source data file is specified on its own line, the parent-child relationships may be viewed conceptually as interlinear. The parent-child relationship is specified by an adopt key field. As used herein, the term "adopt key field" refers to a key field common to the parent and child file records, whose value in each child file record matches a value in exactly one parent file record. A parent file is sorted into its final order before its child files are sorted into their final order. In an embodiment, this requirement will be met if each child file is sorted by the interlinear sort component after the files which are named before that child file in the script. The adopt key field values are used to match the records in the child file to the records in the parent file. A parent position number is attached to each of the parent's child file records and subsequently used to sort the child file records into a parent sequence order.

The computer implemented method and system disclosed herein provides 102 a parsing component executable by at least one processor configured to compile a configuration language and generate file descriptors usable by the interlinear sort component and the interrelated data access component of the interrelated data integration application. The file descriptors are used to reorder the source data files and then to access the source data files in the order defined by the user, and to call user specified predetermined subprograms to compute aggregated values from the source data files. The file descriptors describe the user specified order for each of the source data files and assign one or more predetermined subprograms to perform computation of the aggregated values from the records in the source data files. The configuration language, for example, supports a script written in a scripting language. An application's interfile order requirements and its routines to process record instance and sequence events are defined in the configuration language. The configuration language defines, for example, a lineage relationship $102a$ between the source data files containing one or more records, one or more adopt key fields $102b$ configured to define a parent-child relationship between the records of at least two of the source data files, one or more order key fields $102c$ configured to define the ordering criteria for the records of one or more of the source data files, and one or more predetermined subprograms $102d$ configured to process instances of the records from the source data files, the start point of a sequence or a subsequence of the records of the source data files, and the end point of a sequence or a subsequence of the records of the source data files. As used herein, the term "lineage relationship" defines a parent-child relationship between two source data files, where a parent file is related to a child file by an adopt key field. Furthermore, the lineage relationship defines a parent-child relationship between two source data files, where each of the source data files are graphically related to each other in a tree structure using an array of symbols. In an embodiment, each successive symbol from the array of symbols used in the graphical relation between the source data files depicts each successive level of the lineage relationship between the source data files. The adopt key field is a common key field which establishes a relationship between the records of two source data files. The adopt key field is a common key field that relates each child file containing one or more child file records to a corresponding parent file containing one or more parent file records in the tree structure. Also, as used herein, the term "order key field" refers to a field that defines the relative order of the records in a source data file. Also, as used herein, the term "predetermined subprogram" refers to a set of instructions that the interrelated data integration application will cause to be executed. The predetermined subprograms are configured to compute the aggregated values for the records of the source data files as they are accessed in the user specified order. In an embodiment, the predetermined subprograms are configured to access ancestral records of a selected record or a selected data file from the interrelated source data files. In this embodiment, a programmer skilled in the compiler art can configure the predetermined subprograms to access information in the selected record as per the programmer's requirement.

In an example, the interrelated data integration application executes a predetermined subprogram configured for a child file when a record in that child file is accessed. The predetermined subprograms comprise, for example, routines for processing an instance of each of the records of a source data file, routines for processing the start point of a sequence or a subsequence of records in a source data file, and routines for processing the end point of a sequence or a subsequence of records in a source data file. The configuration language designates the names of user supplied processing routines to be called, as the records are accessed in the defined order. The routines can be written in any computer programming language, for example, a common business oriented language (COBOL) that supports subroutine calls from external programs. The subroutines are compiled by the installation's compiler for that programming language.

Consider an example of an application where claims are related to policies by a policy number. In this example, a "Lineage" subsection of a "Script" section is shown below:

| Script |
| --- |
| Lineage |
| Policy-file<br>• Claim-file |

The single bullet preceding the Claim-file specifies that the Claim-file is the child of the Policy-file. More generally, in this example notation, a file is the child of the closest file name above the file that has one less bullet. This example uses a bullet to define the relationship. However, other special characters such as an inequality sign may be used. In an embodiment, the common key values are defined by an "Adopt" subsection. In that case, the script may continue as shown below:

| Adopt | |
| --- | --- |
| Claim-file | Policy# |

The "Adopt" subsection specifies that the Claim-file is related to its parent Policy-file by the common key field named Policy#. In an embodiment, the desired ordering is specified in a continuation of the script as shown below:

| Order | |
| --- | --- |
| Policy-file | Insured# |
| Claim-file | Claim# |

The preceding "Order" subsection specifies that when the interrelated data integration application runs, the Policy-file records are to be accessed in an insured number order. Since the Claim-file is the child of the Policy-file, the Claim-file records will be accessed by claim number within the insured number order. Therefore, after a Policy-file record is accessed, all the Claim-file records that belong to the Policy-file record will be accessed in a claim number order before the next Policy-file record is accessed. It is not necessary that Insured# be contained in the claim records in order to accommodate this access sequence.

In an embodiment, the names of the predetermined subprograms that compute the aggregated values for the source data file records are defined in a "Process" section of the configuration language. In the example, after the "Script" section, these names are specified in a "Process" section as follows:

| Process | |
| --- | --- |
| Upon | |
| Policy-file | Policy-routine |
| Claim-file | Claim-routine |
| Before | |
| Claim-file | First-claim |
| After | |
| Policy-file | Policies-totals |
| Claim-file | Policy-claims |

The computer implemented method and system disclosed herein provides 103 the interlinear sort component executable by at least one processor configured to sort each of the source data files into the lineage order sequence defined by the user in the configuration language. As used herein, the term "interlinear sort" refers to a sort operation defined by the configuration language in which the relationship of the source data files to one another is specified by an arrangement of lines. In this arrangement of lines, each source data file is named on one line and a prefix defines the relationship of that source data file to the source data files named on the lines preceding that source data file in the arrangement. Also, as used herein, the term "lineage order" for a source data file without a parent file refers to the order of the source data file after the source data file is sorted on the order key or keys defined for that source data file in the configuration language. For a child file, the "lineage order" refers to the order of the child file after the records of the child file are sorted on the position of their parent file records in the parent file and within that order on the order key or keys specified for the file in the configuration language. The interlinear sort component sorts each of the source data files based on one or more of the lineage relationship, the order key fields, and the adopt key fields defined in the configuration language, and attaches a position number to each of the records of each of the source data files. The position number attached by the interlinear sort component to each of the records of each of the source data files determines the start point of the sequence or the subsequence of the records of the source data files and the end point of the sequence or the subsequence of the records of the source data files. The interlinear sort component sorts each source data file into the order defined in the configuration language and attaches the parent position number to each of the child file records in each child file. If a source data file has no parent, the interlinear sort component sorts 103a the source data file on its order key field. If a file has a parent, the interlinear sort component sorts 103b the child file and its parent file on the adopt key field configured to relate each child file to the parent file. The interlinear sort component collates 103c the parent file and each child file while attaching the parent position number to its corresponding child file records contained in each child file corresponding to the parent file, and then sorts 103d the child file containing the child file records using the parent position number as the primary key and the child file order key field as the secondary key.

The computer implemented method and system disclosed herein provides 104 the interrelated data access component executable by at least one processor configured to access the records in the source data files reordered by the interlinear sort component based on the lineage relationship between the source data files. In step 104, a user's predetermined subprogram for "upon", "before", or "after" record sequence processing receives control, if applicable, as each record is selected in the relationship sequence defined by the user in the configuration language. The interrelated data access component uses the position number attached to each of the records of the source data files to determine access of a subsequent record. The interrelated data access component accesses the records in the source data files one at a time in the order defined in the configuration language. The interrelated data access component identifies record instances and start points and end points of record sequences or subsequences and if there is a predetermined subprogram to compute aggregated values from the source data files specified for the identified event, the interrelated data access component executes the predetermined subprogram. The interrelated data access component uses the parent position numbers to access the sorted records of the source data files in the interrelated order defined in the configuration language and execute the specified record and sequence event routines.

The parent file record positions direct the processing of the interrelated source data files. The interrelated data access component determines the position of each child file record in a source data file using the final position of the parent file record in its source data file. The interrelated data access component recursively employs the final position of the parent file record in its file to determine the position of each child file record in its file. Consequently, the positions of earlier generation records, for example, grandparent records in their files do not need to be known in order to determine the position of a child file record in its file. The interrelated data access component also determines a subsequent record from a source data file for processing of the instances of the records from the source data file using the position of the parent file record of a current record. When records are processed in their defined order, the position of a record's parent file record is used to determine which record should be selected next. The interrelated data access component also determines a start point and an end point of a sequence or a subsequence of the records of the source data files using the position of the parent file record for the purposes of "before" and "after" record sequence processing. That is, the parent file record position is further used to determine the beginning and end of file sequences and subsequences for "before" and "after" processing.

The interrelated data access component processes the source data files sorted by the interlinear sort component, by accessing their records one by one in the order specified in the user's script. If the accessed record is the first of a sequence or a subsequence of records from the accessed record's source data file and if there is a predetermined subprogram defined by the user for this file sequence event, the interrelated data access component calls the predetermined subprogram. If there is a predetermined subprogram defined for an instance of a record from the accessed record's source data file, the interrelated data access component calls the predetermined subprogram. If the record is the last of a sequence or a subsequence of records from the accessed record's source data file and if there is a predetermined subprogram specified by the user for this file sequence event, the interrelated data access component calls the predetermined subprogram.

In an example, the interrelated data access component executes 104*a* an associated "upon" subprogram, if any, to process an instance of a current record in a current source data file. The interrelated data access component then selects 104*b* a subsequent source data file to access as follows: The interrelated data access component uses 104*c* position numbers and parent position numbers, if any, attached to each record in a current source data file to determine whether a subsequent record should be accessed from the current source data file, or a corresponding parent file, if any, or one of the child files contained in the corresponding parent file, if any. The interrelated data access component executes 104*d* the associated "before" subprogram, if any, when a transition from a parent file to a corresponding child file occurs. The interrelated data access component executes 104*e* the associated "after" subprogram, if any, when a transition from a child file to a corresponding parent file occurs.

The computer implemented method and system disclosed herein allows users to update the records accessed and further allows the user to update a record of a given type using data derived from records of other types. The interrelated data access component updates the reordered records in the source data files on invocation of one or more of the predetermined subprograms. Updating is performed by the user specified predetermined subprograms which create new records which replace the input records or by writing them back, for example, to a database file. The computer implemented method and system disclosed herein also allows a user to create new records containing data from any or all of the various source records accessed. The ordering speed and efficiency of the interlinear sort component is similar to that of a modern general purpose sort/merge program since the ordering functions of the component employ sorting and collating functions. The interrelated data access component reads the ordered files produced by the interlinear sort component once in a semi sequential order; hence the interrelated data access component can access these files at speeds which approach the transfer rates of the devices on which they are stored. The computer implemented method and system disclosed herein processes large data because of the capability of forming data interrelationships and accessing interrelated source data files in the defined sequence order at high speeds. The three components of the computer implemented method and system disclosed herein run on any commercial computer, for example, an IBM® mainframe. The computer implemented method and system disclosed herein operates by processing entire files of records. The interrelated data access component accesses these files sequentially or in any other sequence that brings them into the reordering process disclosed herein. The computer implemented method and system disclosed herein performs a combination of compiling, reordering, and coordination of the user routine calls as the records are accessed in a defined order. In an embodiment, the computer implemented method and system disclosed herein is used to interrelate and access the source data files of multiple file formats. In an embodiment, the computer implemented method and system disclosed herein is further configured to create indices to the ordered records in such a way that records associated with the accessed record are also provided access to or made available for a query by a user. In an embodiment, support for index creation and indexed record access can be developed by programmers skilled in the database art.

FIGS. 2A-2B exemplarily illustrate statements in the configuration language to be compiled by the parsing component to generate file descriptors to be subsequently used by the interlinear sort component and the interrelated data access component. The file descriptors describe the user specified order for each of the source data files and designate the predetermined subprograms that perform computation of the aggregated values from the records in the source data files. The configuration language allows its users to define a relationship, for example, between three or more source data files. At runtime, the interrelated data access component provides a user with one at a time access to the records in the source data files in the order established by the statements of the configuration language. The elements of the relationships between the source data files are defined by a "Script" section of the configuration language as exemplarily illustrated in FIG. 2A. The "Script" section comprises subsections, for example, a "Lineage" subsection that defines the lineage relationship between the source data files to be processed, an "Adopt" subsection that defines the relationship between the records of at least two source data files, and an "Order" subsection that defines the ordering criteria for the source data files. A file without a parent file is referred to as a patriarch file. In an example, if a lineage is shown in the form of a tree, the root node of the tree is the patriarch. In the "Lineage" subsection, each data file that is not a patriarch is related to only one parent file.

In an embodiment, the configuration language defines the interrelationship of the source data files graphically instead of using a procedural language. An example of a lineage relationship defined by the configuration language for an insurance company is exemplarily illustrated in FIG. 2A. As exemplarily illustrated in FIG. 2A, the parent of the claims file is the policies file; the parent of the policies file is the insured file; the parent of the insured file is the agent file; and the agent file does not have a parent and is therefore referred to as the patriarch file. When a record is processed by the interrelated data access component at runtime, each of the records in the lineage down to the current record is available to the user processing routine for that record. Thus, for each of the claims records for a policy, the parent policy record is accessible, the grandparent insured record is accessible, and the great grandparent agent record is accessible. This eliminates the need the user of a report program generator (RPG) or a structured query language (SQL) has for creating a new record for each claim with all the relevant data from its ancestral records in the new record, and correspondingly reduces the amount of data processed by the interrelated data integration application.

The configuration language defines the lineage of each file, for example, using a number of bullet symbols preceding the name of the file on the line in which the file is named. In an embodiment, the configuration language defines the lineage of each file, for example, using another special symbol such as an inequality sign, a plus sign, a tab space, a blank, etc. As exemplarily illustrated in FIG. 2A, each successive line has one more bullet than the line above the referenced successive line. In an example, the insurance application may have three types of policy files with corresponding claims files: for fire policies named, for example, as F-policies and F-claims, for commercial general policies named, for example, as CG-policies and CG-claims, and for auto policies named, for example, A-policies and A-claims. In this example, the configuration language defines the lineage as:

| Lineage |
| --- |
| Agent |
| • Insured<br>• • F-policies<br>• • • F-claims<br>• • CG-policies<br>• • • CG-claims<br>• • A-policies<br>• • • A-claims |

In this lineage definition, the parent file of the F-policies, the CG-polices, and the A-policies files is the insured file. This is established by the fact that the insured file line precedes the policies lines and has one less bullet.

The "Lineage" subsection defines the relationship of the data files to be processed by the interrelated data integration application. The child file records are connected to their respective parent file records by a common key field. In an embodiment, the key field that relates a child file record to its parent file record is specified in the "Adopt" subsection of the "Script" section of the configuration language as exemplarily illustrated in FIG. 2A. In the "Adopt" subsection, the parent-child relation of the agent records and the insured records is defined by the values of the common key named, for example, an Agent-id; the parent-child relation of the insured records and the policies records is defined by the common key field Insured-id; and the parent-child relation of the policies records and the claims records is defined by the common key field Policy#.

The "Order" subsection of the "Script" section of the configuration language defines the access order for each source data file as exemplarily illustrated in FIG. 2A. The inter-file access order is specified by the "Lineage" subsection. In this example, the interlinear sort component sorts the agent source data file by the agency name. The interlinear sort component sorts the records in the insured source data file so that they are in order by the name of the agent who wrote their insurance. Within that sequence, the interlinear sort component sorts records in the insured source data file by their assigned insured identification number. The interlinear sort component sorts the policy records by policy number within the insured identification number and consequently within agency name. The interlinear sort component sorts the claims by date of claim within the policy number and consequently within the insured identification number within the agency name.

Because the source data files are in this order, when the interrelated data access component processes an insured record, its agent record will also be available to its processing routine. When the interrelated data access component processes a policy record, its associated insured record and agent record will be available to its processing routine. When the interrelated data access component processes a claim record, its associated policy record and insured record and agent record will be accessible to its processing routine.

The interlinear sort component can sort the records of a source data file by any key field or combination of key fields which the records in that source data file contain. For example, in the above "Order" subsection definition, the agent source data file may be sorted by agent number; the insured source data file may be sorted by insured name; the policies source data file may be sorted by policy premium; and the claims source data file may be sorted by claim amount. With the application source data files sorted according to the "Lineage" subsection and the "Order" subsection defined in the configuration language, the computer implemented method and system disclosed herein allows generation of a single target data file of all the application records where each source data file is within its parent file in the order specified for the source data file. In an embodiment, the interrelated data access component generates a composite data file comprising the interrelated source data files ordered according to a graphical representation of the lineage relationship between the source data files defined in the configuration language. In this embodiment, each child file is sorted and reordered in the corresponding parent file in the composite data file based on the lineage relationship between the source data files for direct and enhanced access to each child file in the corresponding parent file. The availability of this type of source data file simplifies the design and coding of an application that processes interrelated source data files.

In an embodiment, each record is accessed in the order defined by the "Lineage" subsection and the "Order" subsection of the "Script" section, and user processing routines are executed according to the sequence events defined by the configuration language. The sequence events and the user routines which process the sequence events are defined in the "Process" section of the configuration language as exemplarily illustrated in FIG. 2B. In an embodiment, the "Process" section follows the "Lineage" subsection. The subsections of the "Process" section of the configuration language are, for example, an "Upon" subsection, a "Before" subsection, and an "After" subsection as exemplarily illustrated in FIG. 2B. The subsection names designate conditions that may be encountered as the records are processed by the interrelated data access component in the order defined in the "Script" section of the configuration language. Each of the lines within each subsection designates a user written processing routine for a record which will be called when the defined condition occurs. The record is specified by the file name on the left. The user processing routine name follows the file name.

The "Upon" subsection of the "Process" section of the configuration language defines the user routine to be called when the current record is a record from the file named. In the "Upon" subsection, the interrelated data access component calls the user routine agent-routine each time an agent file record is accessed. Similarly, the interrelated data access component calls the insured-routine for each insured record, calls the policy-routine for each policies record, and calls the claim-routine for each claims file record. During processing, the claims-routine adds the claims amount to a claims liability field in the policies record. Similarly, the policy-routine adds the policy claims liability field to an insured's liability field in the insured record; the insured-routine adds the insured's liability field to a claims total field in the agent record; and the agent-routine adds the agent's claims to a claims total field.

The "Before" subsection of the "Process" section of the configuration language defines the user routine to be called when the current record is the first record in a file type subsequence. The interrelated data access component calls this user routine immediately before the routines in the "Upon" subsection, if any, for the first record of that subsequence. In the insured line in the example, the interrelated data access component calls the new-insured routine whenever the first insured record for an agent is encountered. Similarly, the interrelated data access component calls the new-policy routine when the first policy for an insured is encountered, and calls the first-claim when the first claim for a policy is encountered. These routines perform the initialization for their sequence type. The first-claim routine resets, for example, the claims liabilities field in the Policies record.

The "After" subsection of the "Process" section of the configuration language defines the user routine to be called when the current record is last in a file type subsequence. The interrelated data access component calls this user routine immediately after the routines in the "Upon" subsection, if any, for the last record in a subsequence. For example, the policy-total routine displays the total claims for a policy; the insured-total routine displays the total claims for an insured; the agent-total routine displays the total claims for an agency; and the final-total routine displays the total claims for all the company's agents. With an extra line of code in the agent-routine, the insured-routine, the policy-routine, the final-total routine, the agent-total routine, and the insured-total routine, the interrelated data integration application computes and displays relevant premium numbers for each of the insureds, each of the agents, and for the insurance company.

The parsing component configured as disclosed in the detailed description of FIGS. 1A-1B, compiles the constructs of the "Script" section and the "Process" section of the configuration language and stores the information in a form that is useful to the runtime operation. The parsing component generates file descriptors which are used by the interlinear sort component to reorder the source data files and by the interrelated data access component to access the reordered files and call the predetermined subprograms or predefined user processing routines. The parsing component can be developed by programmers skilled in the compiler art. In an embodiment, the parsing component can be compiled by the programmers skilled in the compiler art using programming languages, for example, C, C++, etc. The interlinear sort component orders each source data file using its file descriptors. The interrelated data access component processes the sorted source data files using the file descriptors to call the "Upon", "Before", and "After" subprograms for each source data file.

FIG. 3 exemplarily illustrates an operation of the interlinear sort component for sorting records of the source data files. When the interlinear sort component is executed, the interlinear sort component performs sorting of the records of the source data files based on the "Script" section defined in the configuration language as exemplarily illustrated in FIG. 2A. The interlinear sort component orders each file, for example, according to one of these two sets of instructions or rules exemplarily illustrated in FIG. 3. In the case where the source data file is a patriarch source data file, that is, a source data file which has no parent, the interlinear sort component sorts the records in the patriarch source data file by the order key field defined in the "Script" section and the "Order" subsection of the configuration language. If the source data file is a parent file, the interlinear sort component also attaches to each record of the source data file the position number of that record in the sorted source data file. In an embodiment, if the source data file is a parent file, the final position of each parent file record in the parent file is used to determine the position of each child file record in its child file. This is performed recursively by the interlinear sort component. Consequently, the positions of earlier generation records, for example, a record of a grandparent file, etc., in the interrelated source data files do not need to be known in order to determine the final position of the child file records in the child file. In an embodiment, the interlinear sort component does not attach the position number to the record of the source data file, but creates another file of extracted keys whose records contain the position number and the adopt key values for each record in the source data file.

If the source data file is a child file, that is, if the source data file has a parent defined in the "Lineage" subsection under the "Script" section of the configuration language, the interlinear sort component sorts the child file on the adopt key field defined in the "Adopt" subsection under the "Script" section of the configuration language. The interlinear sort component also sorts the parent file based on the adopt key field defined in the "Adopt" subsection under the "Script" section of the configuration language. The interlinear sort component then collates the records in the child file and the parent file. In the collate operation, each source child file record is matched by its adopt key value to the source parent file record which has the same adopt key value, and the position number of the matching source parent file record is attached to the child file record. In an embodiment, the interlinear sort component then sorts the child file records based on the parent position number and the order key or keys defined for the child file in the configuration language. In the sort operation, the parent position is used as the primary key and child file order key or keys as the secondary key. After this sort operation, the records in the child file are in the order they will be accessed by the interrelated data access component. In another embodiment, the parent file's extracted key file is sorted and collated instead of the parent file.

File adoption refers to the process described in the preceding paragraph. In the file adoption process, the parent file remains in its original order, which is its access order for the interrelated data access component. The parent file created for the file adoption process is only a temporary file. For this reason, the temporary parent file records need to contain only the data required for the file adoption process, that is, the position number and the adopt key value for each child file record of the parent file record.

FIG. 4 exemplarily illustrates an algorithm implemented by the interrelated data access component for accessing records in source data files in an order defined by the configuration language and for executing predetermined subprograms to compute the aggregate values of the records of the source data files. The algorithm is expressed in a pseudo language. The interrelated data access component accesses the records sorted by the interlinear sort component one at a time in the interfile order defined by the "Script" section of the configuration language and calls the user specified predetermined subprogram. The interrelated data access component performs access processing by utilizing the parent position number attached to each child file record by the interlinear sort component. In an embodiment, this parent position number is the position of the parent file record in its parent file. In another embodiment, the parent position number is the key or keys by which the parent is ordered if the order key has a unique value in every parent file record in the parent file.

The interrelated data access component utilizes the file descriptor structures generated by the parsing component and updated by the interlinear sort component to process the source data files. The procedure exemplarily illustrated in FIG. 4 has four separate subprocesses, one for each of the four different kinds of source data files that can be defined in the "Lineage" subsection of the configuration language script: (A) a patriarch source data file without a child file; (B) a patriarch source data file with one or more child files; (C) a child file with no child files of its own; (D) a child file with one or more child files of its own. Subprocess (A) is used for a single source data file. Subprocesses (B) and (C) are employed when the set of source data file contains both parent and children files. Subprocesses (B) and (C) and (D) are employed when the script also specifies one or more files with both child and parent files.

The pseudo code algorithm, exemplarily illustrated in FIG. 4, operates on a set of source data files which are in the form of a general tree structure, that is, a tree in which a parent node may have more than two child nodes. A file tree refers to a tree defined by the "Lineage" subsection of the "Script" section in the configuration language. The records in the source data files are related to one another in a record tree structure which follows the pattern of the file tree. As used herein, the term "record tree" refers to the tree of records formed by the current set of records from the set of source data files being processed by the interrelated data access component. The procedure exemplarily illustrated in FIG. 4 does not process a child file record in the record tree until after its parent has been processed. This is the purpose of the test at B# and D# to determine whether or not the child file record's parent# belongs to its parent file position. The conditional loops B#-BQ and D#-DQ cause all of the children of a record tree parent to be tested before the next record in parent file is read. The return points in BQ and DQ from the C and D subprocesses cause the conditional loop test to be resumed. The tests for parent#=parent position# at CP and DP, ensure that when a child file record is selected after the child file record is determined at B# or D# that its parent file record has been processed, all the descendants of the parent file record on the record tree will be processed before the next parent file record is read.

The pseudo code algorithm, exemplarily illustrated in FIG. 4, exemplifies an algorithm for executing the predetermined subprograms for a set of interrelated source data files which have been ordered by the interlinear sort component. The logic of the algorithm may be augmented to execute the predetermined "Before" subprograms for a sorted set of source data files by calling the specified "Before" subprogram for a file: (1) before the "Upon" subprogram is executed for the first record of a patriarch file; (2) whenever a child file is selected by a parent file process, for example, in FIG. 4, at B# or D#. The logic of the pseudo code algorithm exemplarily illustrated in FIG. 4 may be augmented to execute the predetermined "After" subprograms for a sorted set of source data files by calling the specified "After" subprogram: (1) whenever a parent file is selected by a child file process, for example, in FIG. 4, by the pseudo code lines immediately after lines CP and DP; (2) whenever an end of source data file occurs.

Figure 5:
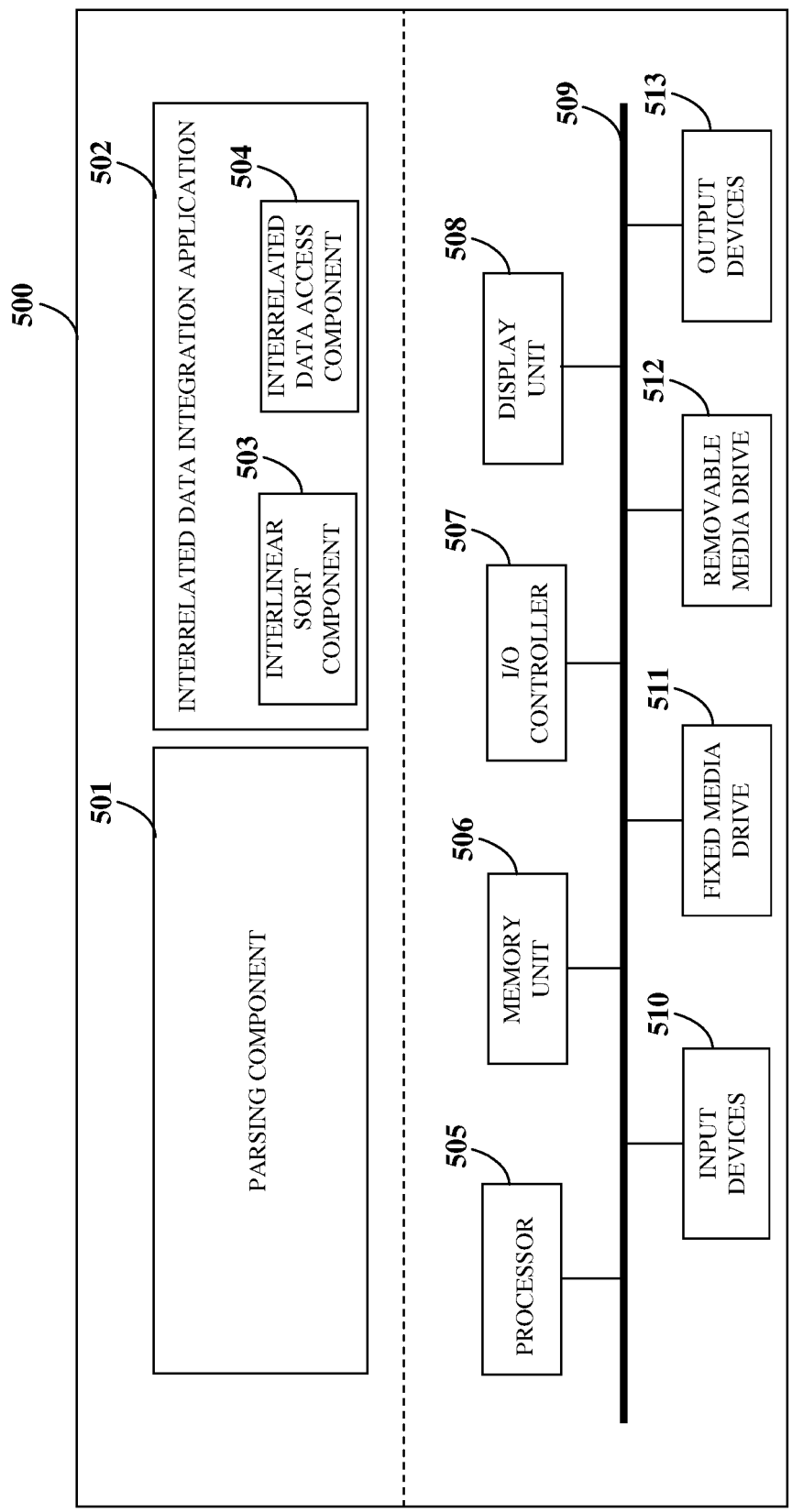
FIG. 5 exemplarily illustrates a computer implemented system for interrelating multiple source data files and providing ordered access to the interrelated source data files.

FIG. 5 exemplarily illustrates a computer implemented system 500 for interrelating multiple source data files and providing ordered access to the interrelated source data files. The computer implemented system 500 disclosed herein comprises at least one processor 505, a non-transitory computer readable storage medium communicatively coupled to the processor 505, a parsing component 501, and an interrelated data integration application 502. The interrelated data integration application 502 comprises an interlinear sort component 503 and an interrelated data access component 504. The term "processor" refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 505 may also be implemented as a processor set comprising, for example, a general purpose microprocessor and a math or graphics co-processor. The processor 505 is selected, for example, from the Intel® processors such as the Itanium® microprocessor or the Pentium® processors, Advanced Micro Devices (AMD®) processors such as the Athlon® processor, UltraSPARC® processors, microSPARC™ processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The computer implemented system 500 disclosed herein is not limited to employing a processor 505. The computer implemented system 500 may also employ a controller or a microcontroller. The processor 505 executes the parsing component 501, the interlinear sort component 503, and the interrelated data access component 504 of the computer implemented system 500.

The term "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 505, except for a transitory, propagating signal. The non-transitory computer readable storage medium comprises, for example, a memory unit 506 for storing programs and data. The memory unit 506 is used for storing programs, applications, and data. For example, the parsing component 501, the interlinear sort component 503, the interrelated data access component 504, etc., are stored in the memory unit 506 of the computer implemented system 500. The memory unit 506 is, for example, a random access memory (RAM) or another type of dynamic storage device that stores information and instructions for execution by the processor 505. The memory unit 506 also stores temporary variables and other intermediate information used during execution of the instructions by the processor 505. The computer implemented system 500 further comprises a read only memory (ROM) or another type of static storage device that stores static information and instructions for the processor 505.

The interrelated data integration application 502 accesses and processes the records of the interrelated source data files in the order defined by a graphical representation of the lineage relationship between the source data files defined in the configuration language. The non-transitory computer readable storage medium stores the components of the computer implemented system 500, for example, the parsing component 501, and the interlinear sort component 503 and the interrelated data access component 504 of the interrelated data integration application 502. The computer implemented system 500 is programmable using a high level computer programming language. The computer implemented system 500 may be implemented using programmed and purposeful hardware.

The parsing component 501 compiles a configuration language and generates file descriptors usable by the interlinear sort component 503 and the interrelated data access component 504. The configuration language defines a lineage relationship between the source data files, one or more adopt key fields, one or more order key fields, and one or more predetermined subprograms as disclosed in the detailed description of FIGS. 1A-1B. The interlinear sort component 503 sorts each of the source data files based on one or more of the lineage relationship, the order key fields, and the adopt key fields defined in the configuration language, and attaches a position number to each of the records of each of the source data files as disclosed in the detailed description of FIGS. 1A-1B. The interrelated data access component 504 accesses the records in the source data files reordered by the interlinear sort component 503 based on the lineage relationship between the source data files, and uses the position number to determine access of a subsequent record as disclosed in the detailed description of FIGS. 1A-1B.

The computer implemented system 500 further comprises, for example, an input/output (I/O) controller 507, a data bus 509, a display unit 508, input devices 510, a fixed media drive 511, a removable media drive 512 for receiving removable media, output devices 513, etc. The I/O controller 507 controls input actions and output actions performed by the computer implemented system 500. The data bus 509 permits communications between the components, for example, 501, 503, 504, etc., of the computer implemented system 500. The display unit 508 displays information, display interfaces, user interface elements such as text fields, checkboxes, text boxes, windows, etc., for example, for allowing a user to view a graphical representation of the lineage relationship between the source data files and to access the interrelated source data files. The display unit 508 comprises, for example, a liquid crystal display, a plasma display, an organic light emitting diode (OLED) based display, etc. The input devices 510 are used for inputting data into the computer implemented system 500. The users use the input devices 510 to provide inputs to the computer implemented system 500. For example, a user may enter a user processing routine for processing the interrelated source data files using the input devices 510. The input devices 510 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the computer implemented system 500. The programs are loaded onto the fixed media drive 511 and into the memory unit 506 of the computer implemented system 500 via the removable media drive 512. Computer applications and programs are executed by double clicking a related icon displayed on the display unit 508 using one of the input devices 510. The output devices 513 output the results of operations performed by the computer implemented system 500. For example, the computer implemented system 500 provides a composite data file comprising the interrelated source data files ordered according to a graphical representation of the lineage relationship between the source data files defined in the configuration language to users using the output devices 513. The computer implemented system 500 displays the composite data file using the output devices 513.

The processor 505 executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., Palm OS®, the Solaris operating system developed by Sun Microsystems, Inc., the Android operating system, Windows Phone® operating system of Microsoft Corporation, BlackBerry® operating system of Research in Motion Limited, the iOS operating system of Apple Inc., the Symbian® operating system of Symbian Foundation Limited, etc. The computer implemented system 500 employs the operating system for performing multiple tasks. The operating system is responsible for management and coordination of activities and sharing of resources of the computer implemented system 500. The operating system further manages security of the computer implemented system 500, and peripheral devices connected to the computer implemented system 500. The operating system employed on the computer implemented system 500 recognizes, for example, inputs provided by the users using one of the input devices 510, the output display, files, and directories stored locally on the fixed media drive 511, for example, a hard drive. The operating system on the computer implemented system 500 executes different programs using the processor 505. The processor 505 and the operating system together define a computer platform for which application programs in high level programming languages are written.

The processor 505 retrieves instructions for executing the components, for example, 501, 503, 504, etc., of the computer implemented system 500 from the memory unit 506. A program counter determines the location of the instructions in the memory unit 506. The program counter stores a number that identifies the current position in the program of each of the components, for example, 501, 503, 504, etc., of the computer implemented system 500. The instructions fetched by the processor 505 from the memory unit 506 after being processed are decoded. The instructions are stored in an instruction register in the processor 505. After processing and decoding, the processor 505 executes the instructions. For example, the parsing component 501 defines instructions for compiling the configuration language and generating file descriptors usable by the interlinear sort component 503 and the interrelated data access component 504 of the interrelated data integration application 502. Furthermore, the parsing component 501 defines instructions for defining a lineage relationship between the source data files containing one or more records. Furthermore, the parsing component 501 defines instructions for defining one or more adopt key fields for relating each child file containing one or more child file records to a corresponding parent file containing one or more parent file records in a tree structure. Furthermore, the parsing component 501 defines instructions for defining one or more order key fields for defining ordering criteria for the records of one or more source data files. Furthermore, the parsing component 501 defines instructions for defining one or more predetermined subprograms for processing instances of one or more records from the source data files, a start point of a sequence or a subsequence of the records of the source data files, and an end point of the sequence or the subsequence of the records of the source data files.

The interlinear sort component 503 defines instructions for sorting each of the source data files based on one or more of a lineage relationship, one or more order key fields, and one or more adopt key fields defined in the configuration language, and for attaching a position number to each of the records of each of the source data files. Furthermore, the interlinear sort component 503 defines instructions for attaching a parent position number to each of the child file records in each child file. Furthermore, the interlinear sort component 503 defines instructions for sorting each of the source data files that has no parent file on an order key field of each of the source data files and for sorting each child file that has a parent file based on an adopt key field configured to relate each child file to the parent file. Furthermore, the interlinear sort component 503 defines instructions for collating the parent file and each child file and attaching a parent position number to each of the child file records contained in each child file corresponding to the parent file; and for sorting each child file using the parent position number as the primary key and the child file order key field as the secondary key.

The interrelated data access component 504 defines instructions for accessing the records in the source data files reordered by the interlinear sort component 503 based on the lineage relationship between the source data files, and for determining access of a subsequent record using the position number. The interrelated data access component 504 defines instructions for updating the reordered records in the source data files on invocation of one or more of the predetermined subprograms. Furthermore, the interrelated data access component 504 defines instructions for determining a start point or an end point of a sequence or a subsequence of child file records from one or more child files of a parent file using one or more order key fields used to order the parent file. Furthermore, the interrelated data access component 504 defines instructions for generating a composite data file comprising the interrelated source data files according to a graphical representation of the lineage relationship between the source data files defined in the configuration language. Furthermore, the interrelated data access component 504 defines instructions for executing one of the predetermined subprograms configured to process the instances of a current record of a current source data file, and for accessing a subsequent source data file using a parent position number attached to a current record of a current source data file. Furthermore, the interrelated data access component 504 defines instructions for determining a subsequent record to be accessed from one or more of the current source data file, a corresponding parent file, and one of the child files contained in the corresponding parent file, based on one or more of a position number and a parent position number attached to each of the records in the current source data file; and for executing another predetermined subprogram on an occurrence of a transition from a parent file to a corresponding child file or an occurrence of a transition from a child file to a corresponding parent file.

The processor 505 of the computer implemented system 500 retrieves the instructions defined by the parsing component 501, the interlinear sort component 503, the interrelated data access component 504, etc., and executes the instructions, thereby performing one or more processes defined by those instructions. At the time of execution, the instructions stored in the instruction register are examined to determine the operations to be performed. The processor 505 then performs the specified operations. The operations comprise arithmetic operations and logic operations. The operating system performs multiple routines for performing a number of tasks required to assign the input devices 510, the output devices 513, and memory for execution of the components, for example, 501, 503, 504, etc., of the computer implemented system 500. The tasks performed by the operating system comprise, for example, assigning memory to the components, for example, 501, 503, 504, etc., of the computer implemented system 500, and to data used by the computer implemented system 500, moving data between the memory unit 506 and disk units, and handling input/output operations. The operating system performs the tasks on request by the operations and after performing the tasks, the operating system transfers the execution control back to the processor 505. The processor 505 continues the execution to obtain one or more outputs. The outputs of the execution of the components, for example, 501, 503, 504, etc., of the computer implemented system 500 are displayed to the user on the display unit 508.

Disclosed herein is also a computer program product comprising a non-transitory computer readable storage medium that stores computer program codes comprising instructions executable by at least one processor 505 for interrelating multiple source data files and providing access to the interrelated source data files. The computer program product comprises a first computer program code for defining a lineage relationship between multiple source data files; a second computer program code for defining one or more adopt key fields; a third computer program code for defining one or more order key fields configured to define ordering criteria for the records of one or more of the source data files; a fourth computer program code for defining one or more predetermined subprograms configured to process instances of one or more of the records from the source data files, a start point of a sequence or a subsequence of the records of the source data files, and an end point of the sequence or the subsequence of the records of the source data files; a fifth computer program code for sorting each of the source data files based on one or more of the lineage relationship, the order key fields, and the adopt key fields defined in the configuration language, and attaching a position number to each of the records of each of the source data files; and a sixth computer program code for accessing the reordered records in the source data files based on the lineage relationship between the source data files and using the position number to determine access of a subsequent record. The computer program product further comprises a seventh computer program code for attaching a parent position number to each of the child file records in each child file. The computer program product disclosed herein further comprises one or more additional computer program codes for performing additional steps that may be required and contemplated for interrelating the source data files and providing access to the interrelated source data files. In an embodiment, a single piece of computer program code comprising computer executable instructions performs one or more steps of the computer implemented method disclosed herein for interrelating the source data files and providing access to the interrelated source data files.

The computer program codes comprising computer executable instructions are embodied on the non-transitory computer readable storage medium. The processor 505 of the computer implemented system 500 retrieves these computer executable instructions and executes them. When the computer executable instructions are executed by the processor 505, the computer executable instructions cause the processor 505 to perform the steps of the computer implemented method for interrelating the source data files and providing access to the interrelated source data files.

It will be readily apparent that the various methods, algorithms, and computer programs disclosed herein may be implemented on computer readable media appropriately programmed for computing devices. As used herein, the term "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Java®, assembly languages, etc. Other object-oriented, functional, scripting, and/or logical programming languages may also be used. The computer program codes or software programs may be stored on or in one or more mediums as object code. Various aspects of the method and system disclosed herein may be implemented as programmed elements, or non-programmed elements, or any suitable combination thereof. The computer program product disclosed herein comprises computer executable instructions embodied in a non-transitory computer readable storage medium, wherein the computer program product comprises one or more computer program codes for implementing the processes of various embodiments.

Where databases are described, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention is not limited to a particular computer system platform, processor, operating system, or network. One or more aspects of the present invention may be distributed among one or more computer systems, for example, servers configured to provide one or more services to one or more client computers, or to perform a complete task in a distributed system. For example, one or more aspects of the present invention may be performed on a client-server system that comprises components distributed among one or more server systems that perform multiple functions according to various embodiments. These components comprise, for example, executable, intermediate, or interpreted code, which communicate over a network using a communication protocol. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A computer implemented method for interrelating a plurality of source data files and providing access to said interrelated source data files, said computer implemented method comprising:
    providing an interrelated data integration application comprising an interlinear sort component and an interrelated data access component executable by at least one processor, wherein said interrelated data integration application is configured to sort and access a plurality of records in said source data files according to a graphical representation of a lineage relationship between said source data files defined in a configuration language;
    providing a parsing component executable by at least one processor, said parsing component configured to compile said configuration language and generate file descriptors usable by said interlinear sort component and said interrelated data access component of said interrelated data integration application, said configuration language configured to define:
        said lineage relationship between said source data files, each of said source data files containing one or more of said records, wherein said source data files are graphically related to each other in a tree structure using an array of symbols;
        one or more adopt key fields, wherein a common one of said one or more adopt key fields is configured to relate each child file containing one or more child file records to a corresponding parent file containing one or more parent file records in said tree structure;
        one or more order key fields configured to define ordering criteria for said records of one or more of said source data files; and
        one or more predetermined subprograms configured to process instances of one or more of said records from said source data files, a start point of one of a sequence and a subsequence of said records of said source data files, and an end point of said one of said sequence and said subsequence of said records of said source data files;
    sorting said each of said source data files based on one or more of said lineage relationship, said one or more order key fields, and said one or more adopt key fields defined in said configuration language, and attaching a position number to each of said records of said each of said source data files, by said interlinear sort component of said interrelated data integration application;
    accessing said records in said source data files reordered by said interlinear sort component based on said lineage relationship between said source data files, and using said position number to determine access of a subsequent one of said records, by said interrelated data access component of said interrelated data integration application; and
    outputting on a user device responsive to a user request at runtime a set of records comprising a common lineage relationship.

2. The computer implemented method of claim 1, further comprising attaching a parent position number to each of said one or more child file records in said each child file by said interlinear sort component.

3. The computer implemented method of claim 1, wherein said interrelated data access component is configured to determine:
    a position of each of said one or more child file records of said each of said source data files using a final position of a parent file record in said each of said source data files;
    a subsequent one of said records from one of said source data files for said processing of said instances of said one or more of said records from said source data files using a position of said parent file record of a current one of said records;
    said start point of said one of said sequence and said subsequence of said records of said source data files using said position of said parent file record; and
    said end point of said one of said sequence and said subsequence of said records of said source data files using said position of said parent file record.

4. The computer implemented method of claim 1, wherein each of said one or more child file records comprises a corresponding value in exactly one parent file record.

5. The computer implemented method of claim 1, further comprising updating reordered said records in said source data files by said interrelated data access component on invocation of said one or more predetermined subprograms.

6. The computer implemented method of claim 1, wherein said position number attached by said interlinear sort component to said each of said records of said each of said source data files is configured to determine:
    said start point of said one of said sequence and said subsequence of said records of said source data files; and
    said end point of said one of said sequence and said subsequence of said records of said source data files.

7. The computer implemented method of claim 1, further comprising determining one of a start point and an end point of one of a sequence and a subsequence of said one or more child file records from one or more child files of a parent file using said one or more order key fields used to order said parent file, by said interrelated data access component.

8. The computer implemented method of claim 1, wherein said file descriptors are configured to describe a user specified order for said each of said source data files and assign said one or more predetermined subprograms to perform computation of aggregated values from said records in said source data files.

9. The computer implemented method of claim 1, wherein said sorting of said each of said source data files based on said lineage relationship defined in said configuration language by said interlinear sort component comprises:
    sorting said each of said source data files that has no parent file on an order key field of said each of said source data files; and
    sorting said each child file that has a parent file on an adopt key field configured to relate said each child file to said parent file.

10. The computer implemented method of claim 9, wherein said sorting of said each child file that has said parent file based on said adopt key field comprises:
- collating said parent file and said each child file and attaching a parent position number to each of said one or more child file records contained in said each child file corresponding to said parent file; and
- sorting said each child file using said parent position number as a primary key and said order key field of said each child file as a secondary key.

11. The computer implemented method of claim 1, wherein said accessing of said records in said source data files reordered by said interlinear sort component comprises:
- executing one of said one or more predetermined subprograms configured to process said instances of a current one of said records of a current one of said source data files; and
- accessing a subsequent one of said source data files using a parent position number attached to said current one of said records of said current one of said source data files.

12. The computer implemented method of claim 11, wherein said accessing of said subsequent one of said source data files comprises:
- determining a subsequent one of said records to be accessed by said interrelated data access component from one or more of said current one of said source data files, a corresponding parent file, and one of child files contained in said corresponding parent file, based on one or more of a position number and a parent position number attached to each of said records in said current one of said source data files; and
- executing another of said one or more predetermined subprograms on one of an occurrence of a transition from a parent file to a corresponding one of said child files and an occurrence of a transition from a child file to a corresponding parent file.

13. The computer implemented method of claim 1, wherein each successive symbol from said array of said symbols in said graphical relation between said source data files depicts each successive level of said lineage relationship between said source data files.

14. The computer implemented method of claim 1, further comprising generating a composite data file comprising said interrelated source data files according to said graphical representation of said lineage relationship between said source data files, wherein said each child file is sorted and reordered in said corresponding parent file in said composite data file based on said lineage relationship between said source data files for direct and enhanced access to said each child file in said corresponding parent file.

15. The computer implemented method of claim 1, further comprising creating indices to reordered said records by said interrelated data access component to provide access to records associated with said accessed records.

16. A computer implemented system for interrelating a plurality of source data files and providing access to said interrelated source data files, comprising:
- at least one processor;
- a non-transitory computer readable storage medium communicatively coupled to said at least one processor, said non-transitory computer readable storage medium configured to store a parsing component and an interrelated data integration application;
- said parsing component executable by said at least one processor, said parsing component configured to compile a configuration language and generate file descriptors usable by said interrelated data integration application, said configuration language configured to define:
  - a lineage relationship between said source data files, each of said source data files containing one or more of a plurality of records, wherein said source data files are graphically related to each other in a tree structure using an array of symbols;
  - one or more adopt key fields, wherein a common one of said one or more adopt key fields is configured to relate each child file containing one or more child file records to a corresponding parent file containing one or more parent file records in said tree structure;
  - one or more order key fields configured to define ordering criteria for said records of one or more of said source data files; and
  - one or more predetermined subprograms configured to process instances of one or more of said records from said source data files, a start point of one of a sequence and a subsequence of said records of said source data files, and an end point of said one of said sequence and said subsequence of said records of said source data files;
- said interrelated data integration application executable by said at least one processor, said interrelated data integration application configured to sort and access said records in said source data files according to a graphical representation of said lineage relationship between said source data files defined in said configuration language, wherein said interrelated data integration application comprises:
  - an interlinear sort component configured to sort said each of said source data files based on one or more of said lineage relationship, said one or more order key fields, and said one or more adopt key fields defined in said configuration language, and attach a position number to each of said records of said each of said source data files; and
  - an interrelated data access component configured to access said records in said source data files reordered by said interlinear sort component based on said lineage relationship between said source data files, and use said position number to determine access of a subsequent one of said records; and
- a display, outputting on a user device responsive to a user request at runtime a set of records comprising a common lineage relationship.

17. The computer implemented system of claim 16, wherein said interlinear sort component of said interrelated data integration application is further configured to attach a parent position number to each of said one or more child file records in said each child file.

18. The computer implemented system of claim 16, wherein said interrelated data access component is further configured to determine:
- a position of each of said one or more child file records of said each of said source data files using a final position of a parent file record in said each of said source data files;
- a subsequent one of said records from one of said source data files for said processing of said instances of said one or more of said records from said source data files using a position of said parent file record of a current one of said records;
- said start point of said one of said sequence and said subsequence of said records of said source data files using said position of said parent file record; and said end point of said one of said sequence and said subsequence of said records of said source data files using said position of said parent file record.

19. The computer implemented system of claim 16, wherein said interrelated data access component is further configured to update reordered said records in said source data files on invocation of said one or more predetermined subprograms.

20. The computer implemented system of claim 16, wherein said position number attached by said interlinear sort component to said each of said records of said each of said source data files is configured to determine:
said start point of said one of said sequence and said subsequence of said records of said source data files; and
said end point of said one of said sequence and said subsequence of said records of said source data files.

21. The computer implemented system of claim 16, wherein said interrelated data access component is further configured to determine one of a start point and an end point of one of a sequence and a subsequence of said one or more child file records from one or more child files of a parent file using said one or more order key fields used to order said parent file.

22. The computer implemented system of claim 16, wherein said interlinear sort component is further configured to sort said each of said source data files that has no parent file on an order key field of said each of said source data files.

23. The computer implemented system of claim 16, wherein said interlinear sort component is further configured to sort said each child file that has a parent file on an adopt key field configured to relate said each child file to said parent file, and wherein said interlinear sort component is further configured to collate said parent file and said each child file and attach a parent position number to each of said one or more child file records contained in said each child file corresponding to said parent file, and to sort said each child file using said parent position number as a primary key and said order key field of said each child file as a secondary key.

24. The computer implemented system of claim 16, wherein said interrelated data access component is further configured to execute one of said one or more predetermined subprograms configured to process said instances of a current one of said records of a current one of said source data files, and access a subsequent one of said source data files using a parent position number attached to said current one of said records of said current one of said source data files.

25. The computer implemented system of claim 24, wherein said interrelated data access component is further configured to access said subsequent one of said source data files by:
determining a subsequent one of said records to be accessed from one or more of said current one of said source data files, a corresponding parent file, and one of child files contained in said corresponding parent file, based on one or more of a position number and a parent position number attached to each of said records in said current one of said source data files; and
executing another of said one or more predetermined subprograms on one of an occurrence of a transition from a parent file to a corresponding one of said child files and an occurrence of a transition from a child file to a corresponding parent file.

26. The computer implemented system of claim 16, wherein said interrelated data access component is further configured to generate a composite data file comprising said interrelated source data files according to said graphical representation of said lineage relationship between said source data files, wherein said each child file is sorted and reordered in said corresponding parent file in said composite data file based on said lineage relationship between said source data files for direct and enhanced access to said each child file in said corresponding parent file.

27. A computer program product comprising a non-transitory computer readable storage medium, said non-transitory computer readable storage medium storing computer program codes that comprise instructions executable by at least one processor, said computer program codes comprising:
a first computer program code for providing an interrelated data integration application that comprises an interlinear sort component and an interrelated data access component, wherein said interrelated data integration application is configured to sort and access a plurality of records in a plurality of source data files according to a graphical representation of a lineage relationship between said source data files defined in a configuration language;
a second computer program code for providing a parsing component, said parsing component configured to compile said configuration language and generate file descriptors usable by said interlinear sort component and said interrelated data access component of said interrelated data integration application, said configuration language configured to define;
said lineage relationship between said source data files, each of said source data files containing one or more of said records, wherein said source data files are graphically related to each other in a tree structure using an array of symbols;
one or more adopt key fields, wherein a common one of said one or more adopt key fields is configured to relate each child file containing one or more child file records to a corresponding parent file containing one or more parent file records in said tree structure;
one or more order key fields configured to define ordering criteria for said records of one or more of said source data files; and
one or more predetermined subprograms configured to process instances of one or more of said records from said source data files, a start point of one of a sequence and a subsequence of said records of said source data files, and an end point of said one of said sequence and said subsequence of said records of said source data files;
a third computer program code containing instructions representing said interlinear sort component for sorting said each of said source data files based on one or more of said lineage relationship, said one or more order key fields, and said one or more adopt key fields defined in said configuration language, and attaching a position number to each of said records of said each of said source data files;
a fourth computer program code containing instructions representing said interrelated data access component for accessing reordered said records in said source data files based on said lineage relationship between said source data files, and using said position number to determine access of a subsequent one of said records; and a fifth computer program code for outputting on a user device responsive to a user request at runtime a set of records comprising a common lineage relationship.

28. The computer program product of claim 27, wherein said computer program codes further comprise a sixth computer program code for attaching a parent position number to each of said one or more child file records in said each child file.

* * * * *